A. V. T. DAY.
TRAFFIC CONTROLLING SYSTEM FOR RAILWAYS.
APPLICATION FILED OCT. 29, 1908. RENEWED NOV. 12, 1910.
1,157,850.  Patented Oct. 26, 1915.
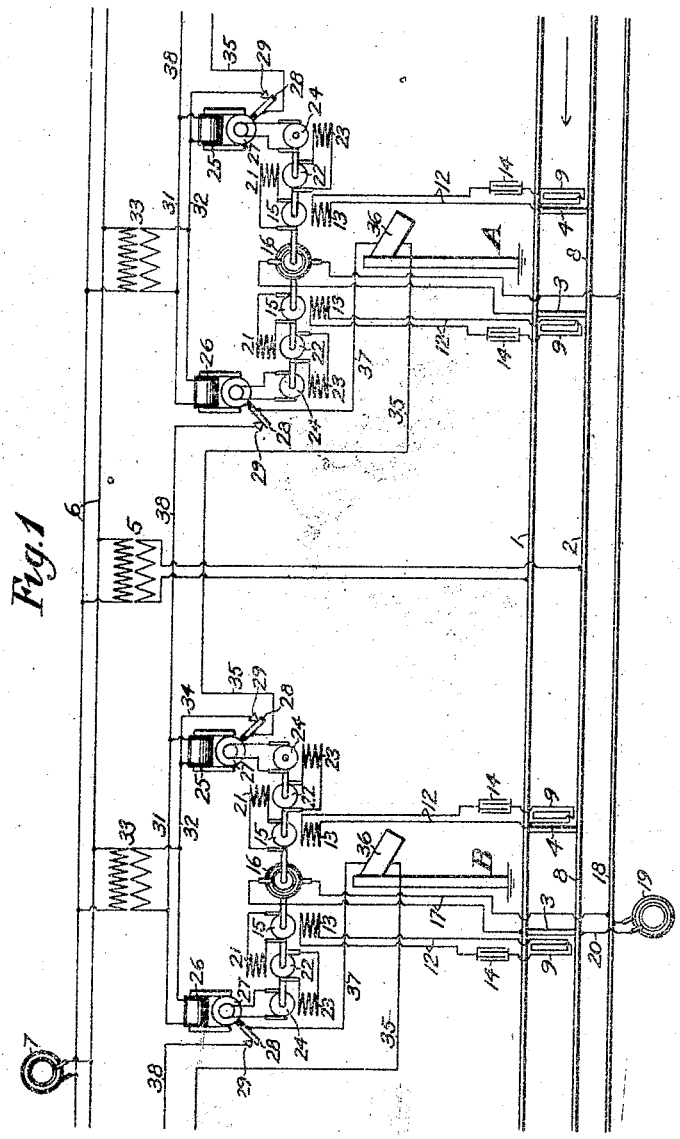
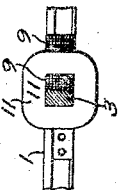
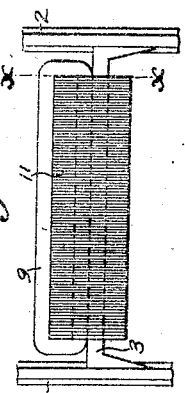
Witnesses
Wm. Ashley Kelly
Inventor
Albert V. T. Day
By Henry D. Williams
Attorney.

UNITED STATES PATENT OFFICE.

ALBERT V. T. DAY, OF NEW ROCHELLE, NEW YORK, ASSIGNOR TO THE HALL SWITCH AND SIGNAL COMPANY, A CORPORATION OF MAINE.

TRAFFIC-CONTROLLING SYSTEM FOR RAILWAYS.

1,157,850.   Specification of Letters Patent.   Patented Oct. 26, 1915.

Application filed October 29, 1908, Serial No. 460,128. Renewed November 12, 1910. Serial No. 592,080.

*To all whom it may concern:*

Be it known that I, ALBERT V. T. DAY, a citizen of the United States, residing at New Rochelle, in the county of Westchester and State of New York, have invented a certain new and useful Improvement in Traffic-Controlling Systems for Railways, of which the following is a specification, reference being had therein to the accompanying drawings, forming part thereof.

My invention relates to electric traffic-controlling systems for railways.

In electric systems for controlling signals or other traffic-controlling devices on railways, it is desirable, for the sake of economy in the expenditure of electrical energy, to use currents as weak as can be depended upon to operate the apparatus reliably. Even with the expenditure of considerable energy, however, the conditions of resistance and impedance may be such, in practice, that the currents effective upon the electric translating devices controlling the signals or other traffic-controlling devices are comparatively faint. For these reasons it has been necessary, in many systems heretofore proposed, to use relays or other electric translating devices of highly sensitive character, and such apparatus is peculiarly liable to faulty action, owing to the sticking of contacts and to other well known causes.

One object of the present invention is to produce an electric traffic-controlling system for railways which shall be reliable in operation and economical in the expenditure of electrical energy.

More specifically, the invention has for its object to reduce either or both the necessity for sensitiveness in the electric translating devices and the expenditure of electrical energy in operating them.

I accomplish the objects above referred to by the use of current-amplifying means, in connection with relays or other translating devices by which comparatively faint currents are amplified or increased in strength sufficiently to enable them to act with certainty. These amplifying means, more specifically described, comprise one or more electric generators so arranged in series that each generator except the first, where more than one are used, has its field energized by the current generated in the armature of the preceding generator, while the field of the first generator is energized by the current which is to be amplified. Any number of generators may be used in this way, and the effect of the apparatus is to amplify or magnify the current in geometrical ratio and in proportion to the number of generators in the series.

I will now describe the embodiment of my invention illustrated in the accompanying drawings, and will thereafter point out my invention in claims.

In the drawings—Figure 1 is a diagram of a portion of an electric traffic-controlling system embodying the present invention. Fig. 2 is a plan view of one of the track transformers used in the system illustrated in Fig. 1. Fig. 3 is a vertical section on the line x—x of Fig. 2, looking from right to left.

Fig. 1 illustrates my invention as applied to the west-bound track of a double-track railway and shows one complete block and portions of two adjacent blocks. The trains move from right to left in the figure. Two signal stations are shown, designated, respectively, as A and B, and as the apparatus at the two stations is precisely similar, the same reference numbers are used to designate corresponding parts at the two stations.

The invention is illustrated as applied to a railway in which electricity is used for traction purposes, and for this reason the track rails 1 and 2 are bonded or otherwise rendered continuously conductive, so as to serve as return conductors for traction current.

Near the ends of each block the rails are connected by heavy cross-bonds 3 and 4, respectively, which not only serve to equalize the flow of traction current in the rails but also constitute portions of the track circuits. In each block the track circuit is energized at or near the middle by a transformer 5, which is energized from transmission wires 6. The transmission wires extend throughout the system and are fed at any convenient point by an alternating-current generator 7. The transformer 5 is connected across the track rails and the track branches from this point, the current flowing through one rail in opposite directions to the ends of the block, through the cross-bonds to the other rail and back again to the middle of the block.

In order to keep the track circuits in adjacent blocks distinct from each other, the cross-bonds 3 and 4 at each signal station are separated from each other for a short distance, so that the impedance of the intervening length of rail 8 tends to prevent any flow of current between the adjacent circuits, and this arrangement, in connection with the use of bonds which offer no substantial resistance to the currents in the track circuits, acts to restrict the currents to their appropriate paths sufficiently for practical purposes.

The currents in the track circuits are rendered effective upon the electric translating devices through transformers, of which the cross-bonds constitute the primary conductors. These transformers are located between the track rails, and their construction is illustrated more particularly in Figs. 2 and 3. Here the cross-bond 3 is illustrated as a heavy bar of rectangular cross-section, of copper or other suitable material. The secondary winding of the transformer consists of an elongated coil 9, which is arranged parallel with the cross-bond. A laminated iron core 11 of ring-shaped cross-section surrounds the cross-bond and one limb of the coil 9.

The currents induced in the track transformers are the currents which are amplified to increase their effectiveness on the translating devices. The coils 9 are connected by wires 12 with the fields 13 of the first generators in the amplifying series. Condensers 14, of such capacity as to be resonant with the signaling currents, are interposed in the wires 12 to exclude foreign currents, such as traction current, and for the same purpose a frequency is chosen for the traction current substantially different from that of the transmission line current. The armatures 15 of the generators above referred to are actuated upon a common shaft by a motor 16, which may be energized from any convenient source. In the drawings the motor is energized by traction current. For this purpose it is connected by wires 17 with the track rails and with the traction conductor 18, which may be a third rail or a trolley wire. The traction conductor is connected with one terminal of a traction-current generator 19, of which the other terminal is connected by a wire 20 with the track rails. The armatures 15 are connected in turn with the fields 21 of the second generators of the series, and the armatures 22 of the latter energize the fields 23 of the final generators. The armatures of the latter furnish the currents by which the signal relays are directly controlled.

The signal relays 25 and 26 are of the polarized alternating-current type. Each relay has a field constantly energized with alternating current, and an armature 27 pivoted in the field and carrying a contact finger 28. The armature is provided with a coil or winding, and the arrangement is such that when both field and armature are energized with currents of the same frequency and of suitable phase relation, the armature tends to rotate in the direction to maintain its contact finger 28 in engagement with a coöperating fixed contact 29.

The armature coils of the relays are connected with the armatures 24 of the amplifying generators. The fields are connected through feed wires 31 and 32 with a transformer 33 at each station, and the transformers 33 are energized from the transmission wires.

The signal relays control line circuits connecting the stations and controlling the signals 36. The line circuit in the illustrated block, starting from the feed wire 32 at B, passes through a wire 34 to the fixed contact and the contact finger of the relay 25, thence through a line wire 35 to the signal 36 at A, thence through a wire 37 to the contact finger and the fixed contact of the relay 26 at A, and thence through a line wire 38 back to the feed wire 31 at B.

The signal 36 may be a semaphore of ordinary form, having a bias to danger position. Electrically controlled mechanism acts, when the circuit above described is closed, to clear the signal and hold it cleared until the circuit is broken. This controlling apparatus may be of any ordinary or suitable form, and it is not illustrated in the drawings.

The motors 16 and the amplifying generators are actuated constantly. In the normal condition of the apparatus, which is illustrated in Fig. 1, the current in the track circuit is amplified at each end of the block and acts to maintain the relays in closed-circuit position, so that the signal at the entrance end of the block is held clear by current in the line circuit. If, however, a train or any rolling stock occupy any portion of a block, with the exception of the short portion between the cross-bonds 3 and 4, the wheels and axles act as cross-conductors, and the current in one or both branches of the track circuit is thereby short-circuited and prevented from reaching the track transformer. By this operation one or both of the signal relays is deënergized, the line circuit is opened, and the signal goes to danger position. A similar result occurs in case a rail be broken.

Although I have illustrated three generators in series as a convenient number for use in the amplifying apparatus, it will be apparent that any number may be used, and in this manner the current may be amplified to any required extent. In any case, the current may be so amplified as to actuate relays of ordinary construction with certainty, although very faint currents are used in the track circuits or other controlling circuits of the system, which would be insufficient to directly actuate ordinary relays or translating devices.

Various modifications may be made in the embodiment of my invention hereinbefore described and illustrated in the accompanying drawings within the nature of the invention and the scope of the following claims.

I claim:

1. An electric traffic-controlling system for railways comprising a traffic-controlling device, a controlling circuit, an electric translating device controlling the traffic-controlling device and amplifying apparatus connecting the translating device and the controlling circuit and consisting of a plurality of generators arranged with the field of the first energized by the controlling circuit, the armature of the last energizing the translating device, and the intermediate fields energized by the intermediate armatures whereby said translating device is governed by the controlling circuit.

2. An electric signal system for railways comprising a track signal, a relay controlling the signal, a track circuit controlling the relay, a source of alternating current for energizing the track circuit, and connections between the track circuit and the relay comprising a plurality of generators of which the first has its field energized from the track circuit, the last energizes the relay, and each generator except the first has its field energized by another of the generators.

In testimony whereof I have affixed my signature in presence of two witnesses.

ALBERT V. T. DAY.

Witnesses:
 VICTOR D. BORST,
 WM. ASHLEY KELLY.